United States Patent
Li et al.

(10) Patent No.: US 9,983,907 B2
(45) Date of Patent: May 29, 2018

(54) RESOURCE-AWARE BACKFILL JOB SCHEDULING

(71) Applicant: International Business Machines Corporation, Armonk, NY (US)

(72) Inventors: Ji Li, Beijing (CN); Xiu Qiao Li, Beijing (CN); Zhenchao Liu, Beijing (CN); Xian Tao Meng, Beijing (CN); Xue Bin Min, Beijing (CN); Sam Sanjabi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 14/923,494

(22) Filed: Oct. 27, 2015

(65) Prior Publication Data
US 2017/0116037 A1   Apr. 27, 2017

(51) Int. Cl.
*G06F 9/46* (2006.01)
*G06F 9/48* (2006.01)

(52) U.S. Cl.
CPC .................. *G06F 9/4893* (2013.01)

(58) Field of Classification Search
None
See application file for complete search history.

(56) References Cited

U.S. PATENT DOCUMENTS

| | | | |
|---|---|---|---|
| 7,703,102 B1* | 4/2010 | Eppstein | H04L 41/0896 709/220 |
| 8,869,158 B2 | 10/2014 | Prabhakar et al. | |
| 2005/0125701 A1 | 6/2005 | Hensbergen et al. | |
| 2012/0144394 A1 | 6/2012 | Prabhakar et al. | |
| 2013/0132969 A1* | 5/2013 | Herdrich | G06F 1/3203 718/104 |
| 2013/0139169 A1* | 5/2013 | Prabhakar | G06F 9/4893 718/104 |
| 2014/0075448 A1 | 3/2014 | Bell, Jr. et al. | |
| 2014/0137122 A1 | 5/2014 | Egolf et al. | |

OTHER PUBLICATIONS

Goiri et al., "Energy-aware Scheduling in Virtualized Datacenters", 2010 IEEE International Conference on Cluster Computing, IEEE Computer Society, DOI 10.1109/CLUSTER.2010.15, © 2010 IEEE, pp. 58-67.

(Continued)

*Primary Examiner* — Gregory A Kessler
(74) *Attorney, Agent, or Firm* — Stephanie L. Carusillo

(57) ABSTRACT

A method, computer program product, and computer system for backfilling jobs based on energy aware scheduling are provided. A first job is received at a scheduler, where the scheduler manages one or more running jobs based on a plurality of system resources. The plurality of system resources comprises at least one resource constraint. A resource consumption of the first job is estimated based on one or more resource requirements of the first job. A first resource requirement of the one or more resource requirements is determined to exceed the resource constraint. In response to determining that the first resource requirement of the first job exceeds at least one resource constraint, at least one of (i) the first resource requirement of the first job and (ii) the plurality of system resources is modified. The first job is scheduled.

18 Claims, 5 Drawing Sheets

(56) References Cited

OTHER PUBLICATIONS

Jung et al., "Continuous Frequency Adjustment Technique Based on Dynamic Workload Prediction", 21st International Conference on VLSI Design, IEEE Computer Society, DOI 10.1109/VLSI.2008.98, © 2008 IEEE, pp. 249-254.
Rong et al., "Power-Aware Scheduling and Dynamic Voltage Setting for Tasks Running on a Hard Real-Time System1", Asia and South Pacific Conference on Design Automation, 2006, DOI: 10.1109/ASPDAC.2006.1594730, © 2006 IEEE, pp. 473-478.
Wang et al., "Towards Energy Aware Scheduling for Precedence Constrained Parallel Tasks in a Cluster with DVFS", 2010 10th IEEE/ACM International Conference on Cluster, Cloud and Grid Computing, IEEE Computer Society, © 2010 IEEE, DOI 10.1109/CCGRID.2010.19, pp. 368-377.

* cited by examiner

# RESOURCE-AWARE BACKFILL JOB SCHEDULING

BACKGROUND OF THE INVENTION

The present invention relates generally to the field of energy conservation aware computing, and more particularly to backfill scheduling based on energy aware scheduling.

A computer cluster consists of a set of connected computers that work together so that they can be viewed as a single system. A cluster can be used a wide variety of applications, such as scientific research, large-scale engineering applications, business computing, and other fields. Job scheduling in clusters is the allocation of jobs, submitted by users, to the appropriate computing resources. Backfill scheduling is designed to maximize the use of resources to achieve high system efficiency. In some cases, backfill scheduling can prevent excessive delays in starting jobs with large resource requirements.

Energy aware scheduling (EAS) is scheduling cluster resources based on environmental factors. For example, EAS can use factors such as temperature and powering down or suspending nodes of the cluster when they are not in use. In some examples, fluctuating workloads can result in nodes sitting idle for a long period of time or a long lead period to full production.

SUMMARY

According to one embodiment of the present invention, a method for backfilling jobs based on energy aware scheduling is provided. The method includes receiving, at a scheduler, a first job, wherein the scheduler manages one or more running jobs based on a plurality of system resources, wherein the plurality of system resources comprises at least one resource constraint; estimating, by one or more processors, a resource consumption of the first job based on one or more resource requirements of the first job; determining, by one or more processors, that a first resource requirement of the one or more resource requirements exceeds the at least one resource constraint; in response to determining that the first resource requirement of the first job exceeds the at least one resource constraint, modifying, by one or more processors, at least one of (i) the first resource requirement of the first job and (ii) the plurality of system resources; and scheduling, by one or more processors, the first job.

According to another embodiment of the present invention, a computer program product for backfilling jobs based on energy aware scheduling is provided. The computer program product comprises a computer readable storage medium and program instructions stored on the computer readable storage medium. The program instructions include program instructions to program instructions to receive a first job at a scheduler, wherein the scheduler manages one or more running jobs based on a plurality of system resources, wherein the plurality of system resources comprises at least one resource constraint; program instructions to estimate a resource consumption of the first job based on one or more resource requirements of the first job; program instructions to determine that a first resource requirement of the one or more resource requirements exceeds the at least one resource constraint; in response to determining that the first resource requirement of the first job exceeds the at least one resource constraint, program instructions to modify at least one of (i) the first resource requirement of the first job and (ii) the plurality of system resources; and program instructions to schedule the first job.

According to another embodiment of the present invention, a computer system for backfilling jobs based on energy aware scheduling is provided. The computer system includes one or more computer processors, one or more computer readable storage media, and program instructions stored on the computer readable storage media for execution by at least one of the one or more processors. The program instructions include program instructions to program instructions to receive a first job at a scheduler, wherein the scheduler manages one or more running jobs based on a plurality of system resources, wherein the plurality of system resources comprises at least one resource constraint; program instructions to estimate a resource consumption of the first job based on one or more resource requirements of the first job; program instructions to determine that a first resource requirement of the one or more resource requirements exceeds the at least one resource constraint; in response to determining that the first resource requirement of the first job exceeds the at least one resource constraint, program instructions to modify at least one of (i) the first resource requirement of the first job and (ii) the plurality of system resources; and program instructions to schedule the first job.

DETAILED DESCRIPTION

An embodiment of the present invention recognizes that energy conservation in cluster computing is a growing concern. Optimizing the processing of jobs performed by can save energy and reduce costs of operating the computing cluster. An embodiment of the present invention provides modifications to resource requirements of jobs in a computing environment (e.g., a cluster computing environment) to increase scheduling throughput. The job scheduler dynamically adjusts resources to backfill jobs. In some embodiments, the processing frequency is adjusted to modify the energy consumption. In other embodiments, the number of processors is adjusted to modify the time of processing the job.

Figure 1:
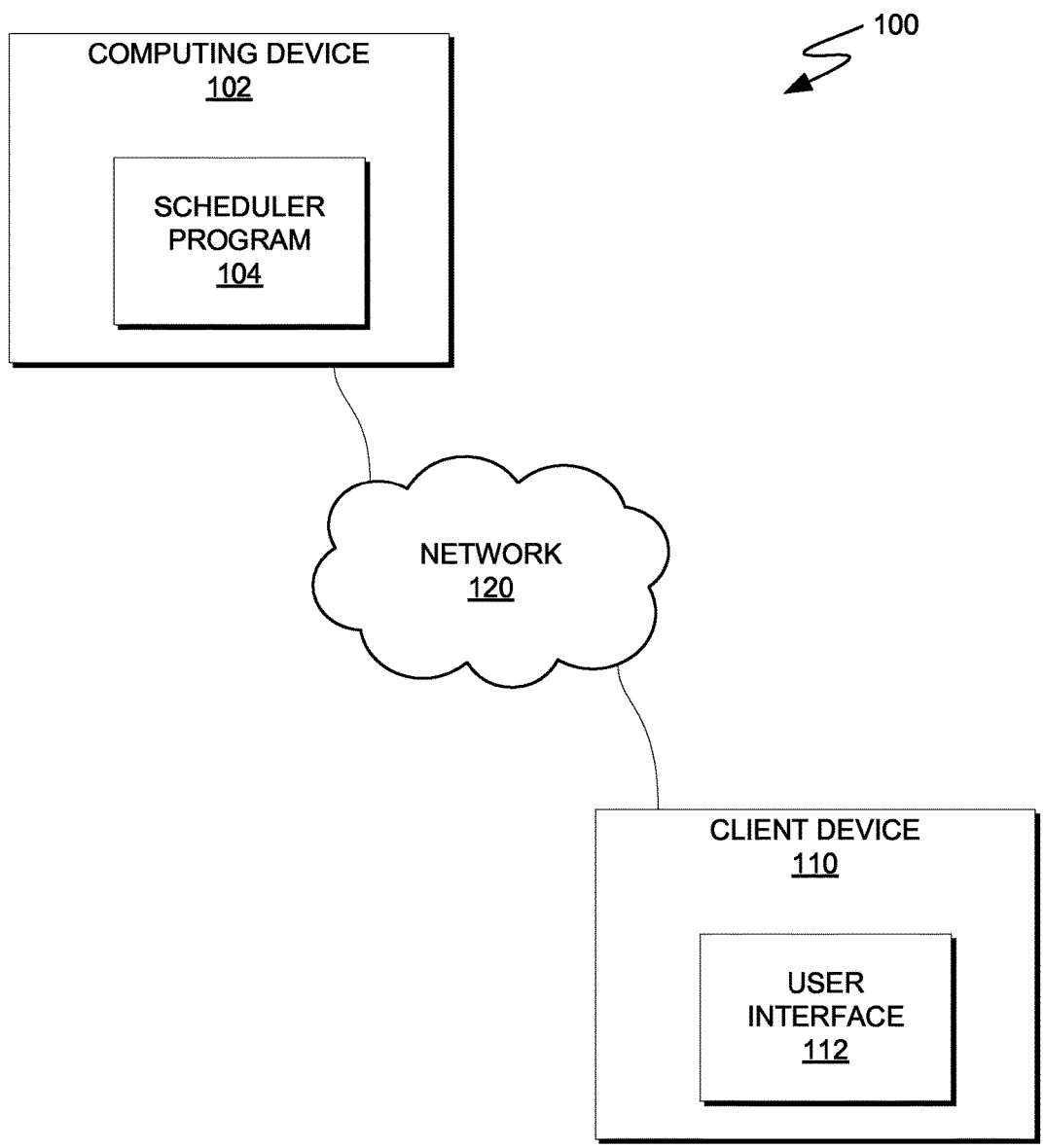
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes scheduler program 104.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to and/or capable of executing scheduler program 104. Computing device 102 may include internal and external hardware components, as depicted and described in further detail with respect to FIG. 5.

In this exemplary embodiment, scheduler program 104 is stored on computing device 102. In other embodiments, scheduler program 104 may reside on another computing device, provided that each can access and is accessible by client device 110. In yet other embodiments, scheduler program 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Scheduler program 104 operates to backfill jobs in a cluster wide job scheduling using energy aware scheduling. In some embodiments, job requests include resource requirements. For example, an estimated time to run the job, number of processors requires, frequency of the central processing unit (CPU), estimated energy consumption, etc. As jobs are added to scheduler program 104, scheduler program 104 analyzes whether the job can be completed with available resources. For example, other jobs may be scheduled or running that utilize some or all of the available resources for the cluster. Where the job cannot be completed with available resource requirements, scheduler program 104 determines whether some of the resource requirements can be modified. For example, in some embodiments, the energy consumption can be lowered by reducing computational power (e.g., number of processors allocated, frequency of the allocated processors, or a combination thereof), thereby lengthening the processing time. In another example, the processing time of a job can be shortened by increasing the number of processors allocated to the job. In some embodiments, scheduler program 104 simulates combinations of resource adjustments to determine if the added job can be completed with the available resources.

In various embodiments of the present invention, client device 110 can be a laptop computer, a tablet computer, a netbook computer, a personal computer (PC), a desktop computer, a personal digital assistant (PDA), a smart phone, or any programmable electronic device capable of communicating with computing device 102 via network 120. In some embodiments, a user uses client device 110 to send a job request to computing device 102.

Client device 110 includes a user interface 112, which executes locally on client device 110 and operates to provide a user interface to a user of client device 110. User interface 112 further operates to receive user input from a user via the provided user interface, thereby enabling the user to interact with client device 110. In one embodiment, user interface 112 provides a user interface that enables a user of client device 110 to interact with scheduler program 104 of computing device 102 via network 120. In various examples, the user interacts with scheduler program 104 in order to assign a new job, configure results of resource allocation, and view the status of one or more pending jobs. In one embodiment, user interface 112 is stored on client device 110. In other embodiments, user interface is stored on another computing device (e.g., computing device 102), provided that user interface 112 can access and is accessible by at least scheduler program 104.

Figure 2:
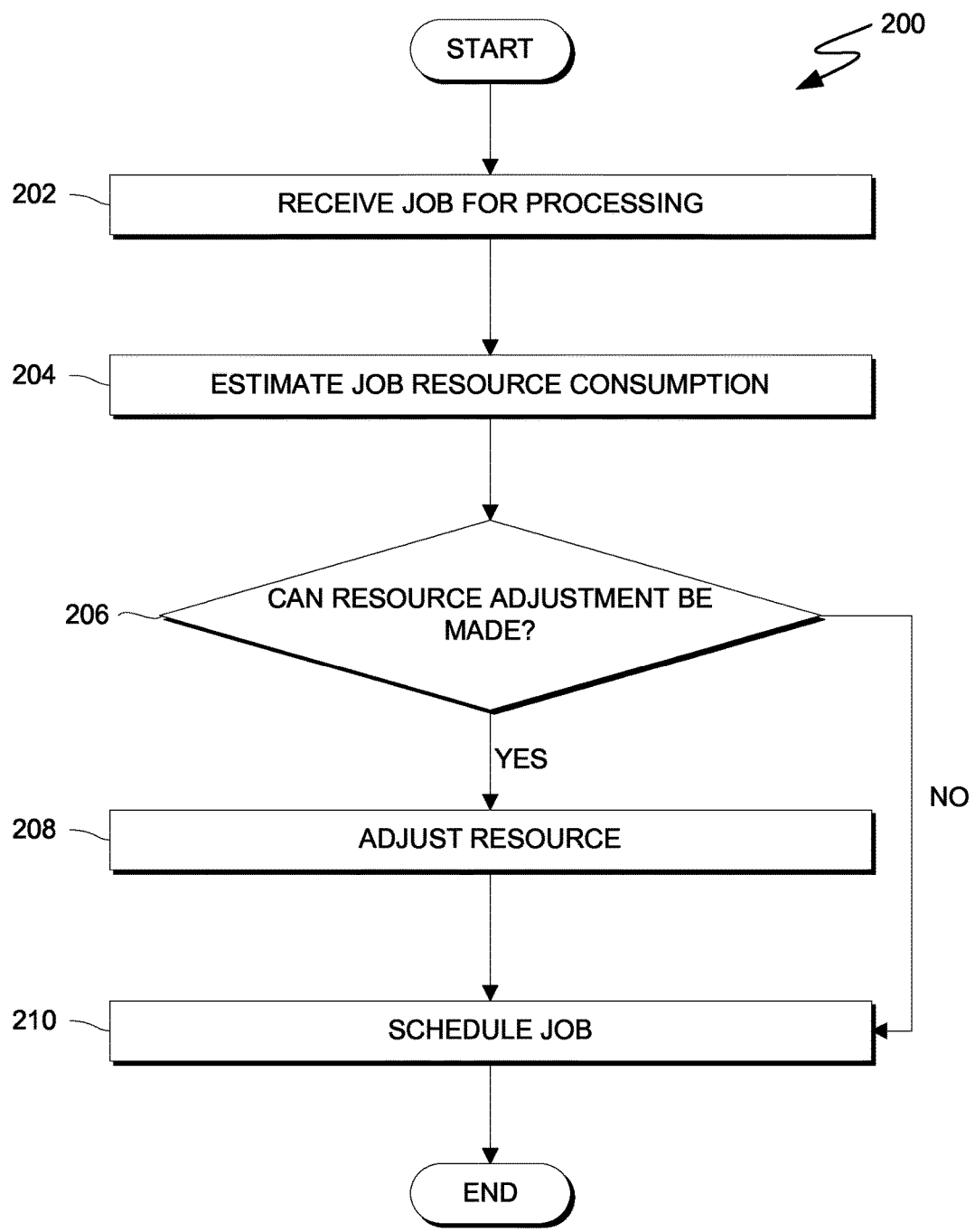
FIG. 2 is a flowchart depicting operations for backfill scheduling jobs, on a computing device within the computing environment of FIG. 1, in accordance with an embodiment of the present invention.

FIG. 2 is a flowchart depicting operations for scheduling backfill jobs, on a computing device within the computing environment of FIG. 1, in accordance with an embodiment of the present invention. For example, FIG. 2 is a flowchart depicting operations 200 of scheduler program 104, on computing device 102 within computing environment 100.

In step 202, scheduler program 104 receives a job for processing. Scheduler program 104 has one or more resource constraints. Resource constraints can include, but are not limited to, number of processors, limit of processing frequency, limit on energy consumption, a window of time, etc. For example, scheduler program 104 may have a number of processors available (e.g., ten) for a specified window of time (e.g., twenty minutes) and at the end of the specified window a number of the processors (e.g., five) are allocated to another job. In this example, a constraint is the number of processors and the window of time. In some embodiments, some or all of the systems resources are unused. In these embodiments, jobs can be backfilled where enough unused resources exist to process the received job. In some examples, several jobs may be pending when scheduler program 104 receives the job for processing. In many examples, several processors may be available for processing a job. In these examples, the available processors may be allocated to processing a pending job a specific time. Therefore, for a job to be backfilled to be completed by the available processors, the job must be completed before the pending job is scheduled to begin. In this example, processing time is a constraint. In other example, the number of available processors is the constraint. For example, a cluster has a finite number of processors and cannot allocate more processors to a job than are available. In yet another example, energy consumption by the cluster is a constraint. For example, in order to reduce the cost of processing, the energy consumption of the cluster is capped. In this example, some available processors cannot be allocated to a job where the use of the processors would cause the energy consumption to exceed the cap.

In step 204, scheduler program 104 estimates a job's resource consumption. Each job requires resources in order for the job to be processed by the cluster. In some embodiments, scheduler program 104 simulates a projected number of resources required for each job. For example, each job requires a certain number of processors operating at a set frequency for a particular amount of time to be processed. Scheduler program 104 estimates the required number of processors, the operating frequency, and processing time (e.g., duration of processing) for each received job. In some embodiments, the resources may be predetermined. For example, a predetermined operating frequency is used (e.g., processors can operate at a minimum frequency, a maximum frequency, or at one or more frequencies between the maximum and minimum frequency). In these embodiments, the operating frequency is predetermined, but can be modified to backfill a job. In this example, a used can specify the number of processors required for a job via the user interface. In other embodiments, the number of processors is based off historical data (e.g., similarly processed jobs). In some embodiments, the processing time is estimated based on the number of processors and operating frequency. When each of the estimated resources are at or lower than the available resources, scheduler program 104 schedules the job. In some embodiments, one or more of the estimated resources will not be available. In these embodiments, scheduler program 104 either has to schedule the job to be completed at a later time when more resources are available or modify the required resources to backfill the job.

In decision 206, scheduler program 104 determines whether a resource adjustment can be made. In some embodiments, the time required to process a job can be shortened by increasing the number of processors or increasing the operating frequency of the processors. In other embodiments, an energy cap can be accommodated by lengthening the time of processing, lowering the operating frequency, or decreasing the number of processors in use. In many examples, where scheduler program 104 has previously scheduled jobs (e.g., running jobs and pending jobs), the cluster has resources that are not being used by the previously scheduled jobs creating resource gaps. In these examples, resources used by the received job can be modified to use the available resources. This allows the received job to be processed at an earlier time and maximizes the use of cluster resources. If scheduler program 104 determines that a resource adjustment can be made (decision 206, YES branch), then the resources are adjusted (step 208). In response to adjusting the received job's resource requirements, the received job can be scheduled in the resource gaps. If scheduler program 104 determines that a resource adjustment cannot be made (decision 206, NO branch), then the job is scheduled at a later time. Jobs scheduled at later times remain in a pending state until the required resources become available.

In step 210, scheduler program 104 schedules the job. The job is either scheduled in a resource gap or is placed at the end of the queue. Jobs scheduled in a resource gap are processed at an earlier time.

Figure 3:
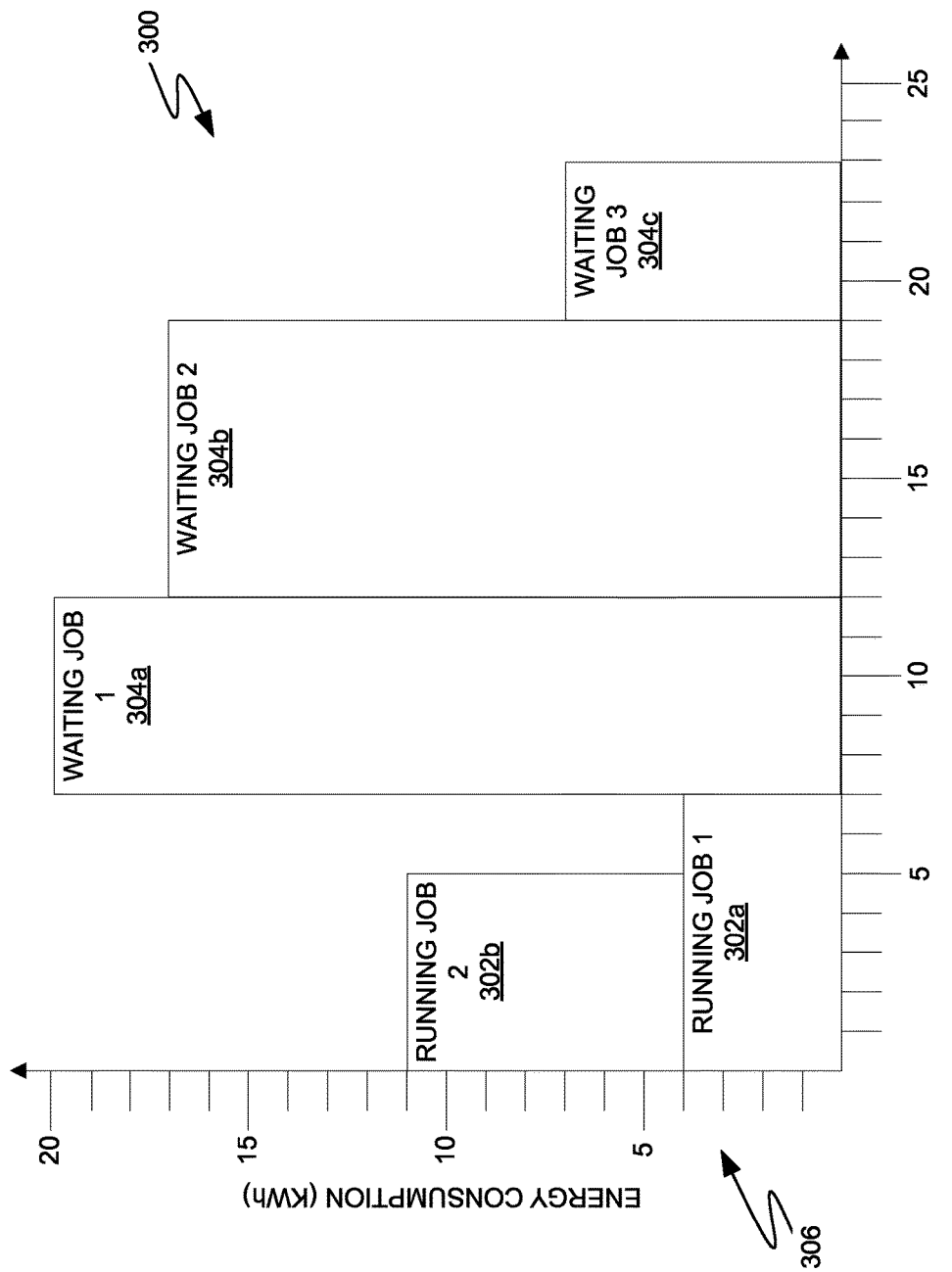
FIG. 3 is an example user interface presenting resource allocation for jobs pending in a scheduler program, in accordance with an embodiment of the present invention.

FIG. 3 an example user interface presenting resource allocation for jobs pending in a scheduler program, in accordance with an embodiment of the present invention. For example, FIG. 3 is a user interface 300 generated by scheduler program 104 executing operations 200, on computing device 102 within computing environment 100. In various embodiments, user interface 300 may represent at least a portion of a window, dialog, or other user interface element of a user interface (e.g., user interface 112) presented via a display device (e.g., display 118). User interface 300 includes user interface elements for each of: running jobs 302a and 302b; waiting jobs 304a, 304b, and 304c; energy constraint 306; and time constraint 308.

User interface 300 is one example of a representation of a queue of pending jobs of scheduler program 104. In this example, the constraints are energy consumption 306 and time 308. In some embodiments, the constraints may be different. For example, the number of computer processors can be the limiting factor in a cluster. In some embodiments, the user may want to limit the energy consumption 306. For example, scheduler program 104 only backfills jobs up to a predetermined number of kilo-watt hours (KWh).

The queue of user interface 300 includes several running and waiting jobs. In this example, the user inputs an energy consumption maximum of 15 kWH. Running job 1 302a is scheduled to take seven minutes and consume four KWh. Running job 2 302b is scheduled to take five minutes to complete and consume seven KWh. Waiting job 1 304a is pending and is set to begin processing at seven minutes. Waiting job 1 304a is scheduled to take five minutes to complete and consume twenty KWh. Waiting job 2 304b is pending and is set to begin processing at twelve minutes. Waiting job 2 304b is scheduled to take seven minutes and consume seventeen KWh. Waiting job 3 304c is pending as the last job submitted to scheduler program 104. Waiting job 3 is scheduled to begin processing at nineteen minutes. Waiting job 3 304c is scheduled to take four minutes to process and consume seven KWh.

Scheduler program 104 completes operations 200 for each pending job that is added to the queue. When waiting job 1 304a is received by scheduler program 104, the job resource consumption is estimated. Scheduler program 104 then determines whether the resources can be adjusted to optimize the processing of waiting job 1 304a. Scheduler program 104 determines that with an energy cap of fifteen KWh, the time to process waiting job 1 304a, at time zero, would be lengthened to twenty-five minutes. Scheduler program 104 determines that adjusting the resources of waiting job 1 304a is inefficient and schedules waiting job 1 304a to begin at seven minutes, when the running jobs are scheduled to be complete and more energy is available for processing. Scheduler program 104 completes operations 200 for waiting job 2 304b to determine that adjusting the resources of waiting job 2 304b is inefficient. Waiting job 2 304b is scheduled to begin processing after waiting job 1 304a, at twelve minutes.

Scheduler program 104 receives waiting job 3 304c and estimates the job resource consumption. Scheduler program 104 determines that at the standard operating frequency of computing device 102, waiting job 3 304c will take four minutes and consume seven KWh. Scheduler program 104 determines whether the job resource consumption can be adjusted to start processing at time zero. Scheduler program 104 determines that by reducing the frequency of waiting job 3 304c, the energy consumption can be reduced. The result of the job resource adjustment to waiting job 3 304c is seen in FIG. 4.

Figure 4:
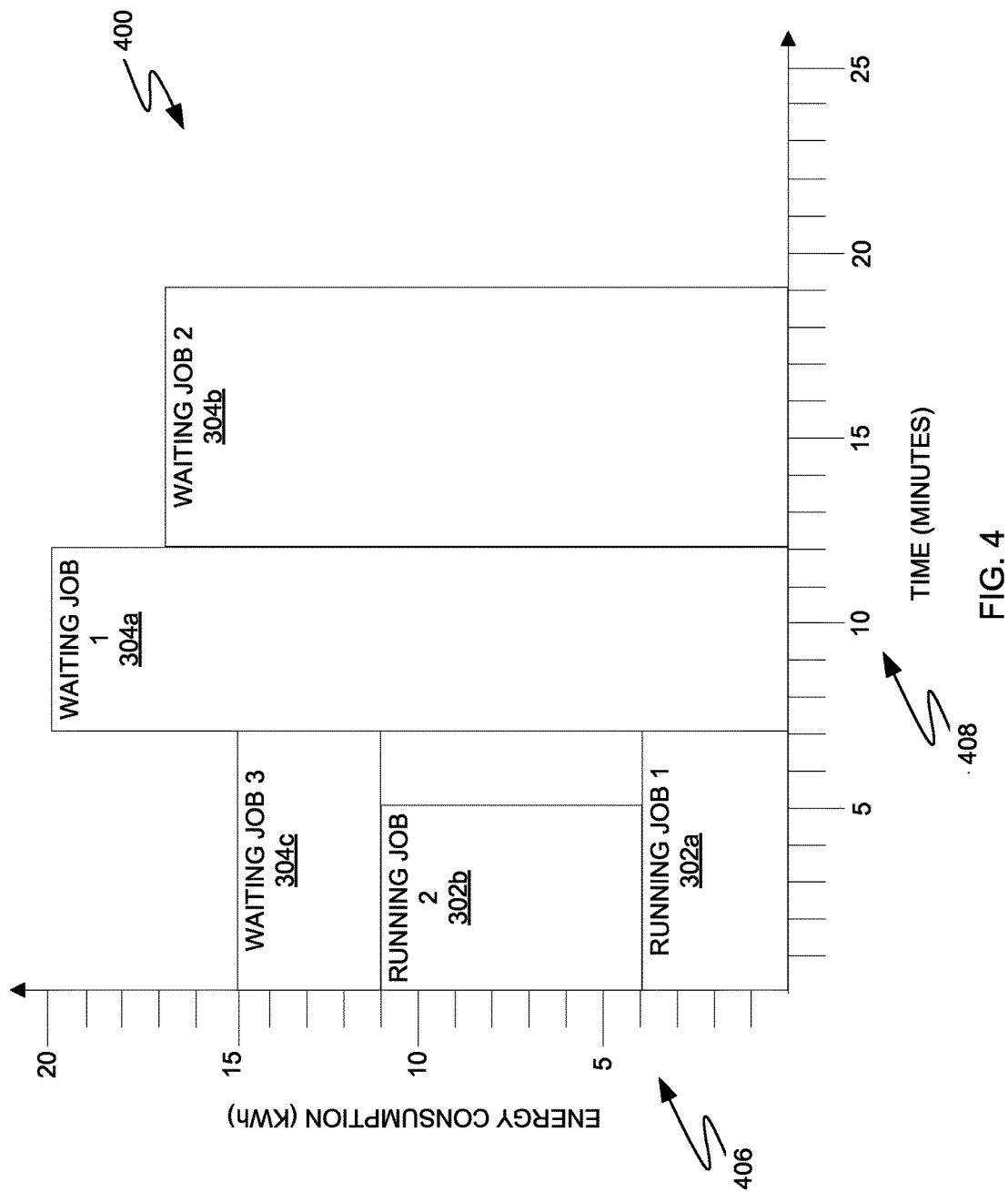
FIG. 4 is an example user interface presenting resource allocation for backfilled jobs in a scheduler program, in accordance with an embodiment of the present invention.

FIG. 4 is an example user interface presenting resource allocation for backfilled jobs in a scheduler program, in accordance with an embodiment of the present invention. For example, FIG. 4 is a user interface 400 generated by scheduler program 104 executing operations 200, on computing device 102 within computing environment 100. In various embodiments, user interface 400 may represent at least a portion of a window, dialog, or other user interface element of a user interface (e.g., user interface 112) presented via a display device (e.g., display 118).

User interface 400 is one example of a representation of a queue of pending jobs within scheduler program 104 after operations 200 have been completed. In this example, the constraints are energy consumption 406 and time 408.

User interface 400 includes several running and waiting jobs. In this example, the energy consumption is capped at 15 kWH. Running job 1 302a is scheduled to take seven minutes and consume four KWh. Running job 2 302b is scheduled to take five minutes to complete and consume seven KWh. Waiting job 1 304a is pending and is set to begin processing at seven minutes. Waiting job 1 304a is scheduled to take five minutes to complete and consume twenty KWh. Waiting job 2 304b is pending and is set to begin processing at twelve minutes. Waiting job 2 304b is scheduled to take seven minutes and consume seventeen KWh.

Waiting job 3 304c was modified by scheduler program 104 to allow waiting job 3 304c to process at time zero. The frequency for waiting job 3 304c was reduced to lower the energy consumption of the job to four KWh. By reducing the energy consumption, the time to process the job was increased from four minutes to seven minutes. Scheduler program 104 backfilled waiting job 3 304c into an open processing window as a result of the job resource adjustments.

Figure 5:
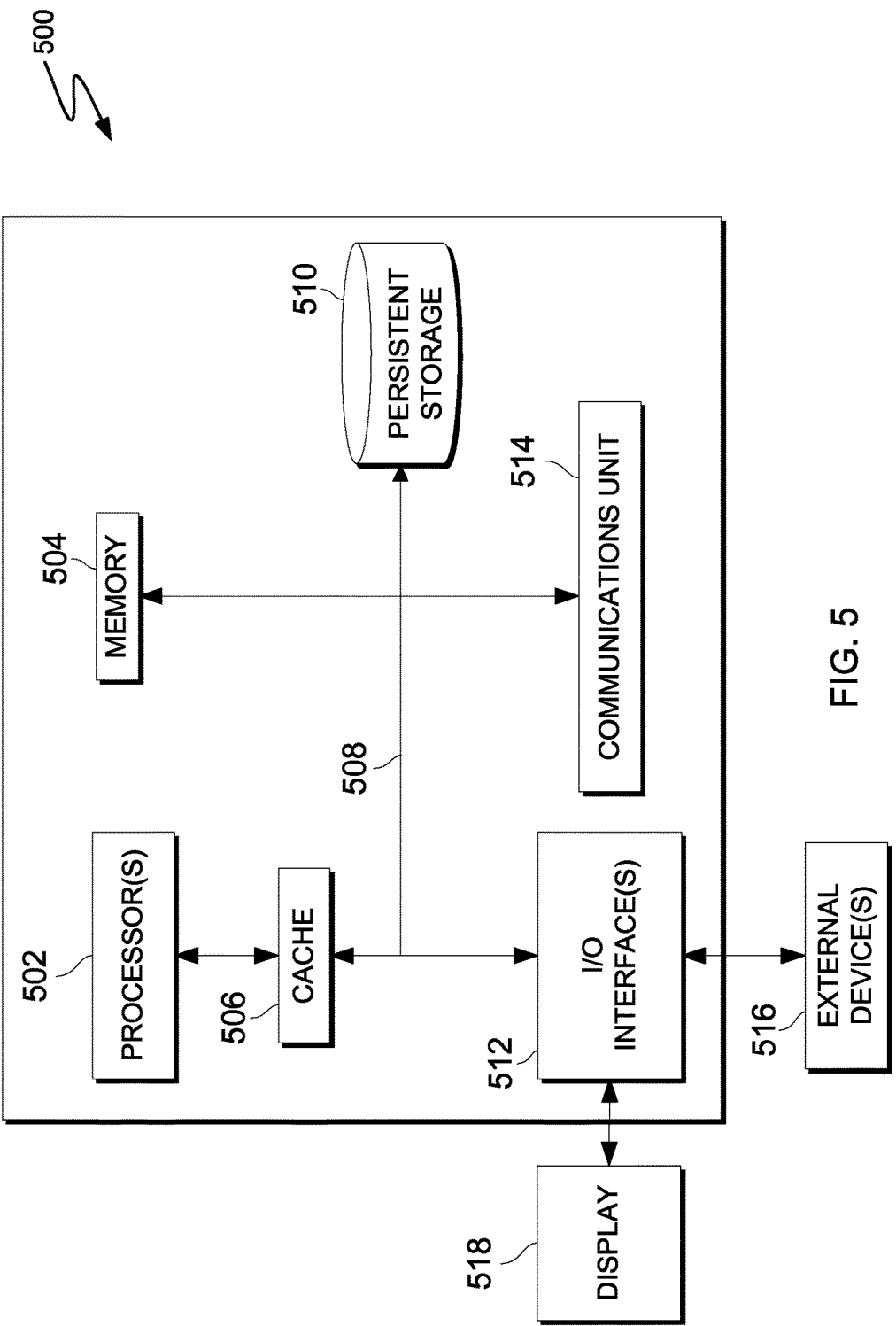
FIG. 5 is a block diagram of components of a computing device executing operations for backfill scheduling jobs, in accordance with an embodiment of the present invention.

FIG. 5 is a block diagram of components of a computing device, generally designated 500, in accordance with an embodiment of the present invention. In one embodiment, computing device 500 is representative of client device 110. For example, FIG. 5 is a block diagram of computing device 102 within computing environment 100 executing operations of AR marker program 104.

It should be appreciated that FIG. 4 provides only an illustration of one implementation and does not imply any limitations with regard to the environments in which different embodiments may be implemented. Many modifications to the depicted environment may be made.

Computing device 500 includes communications fabric 508, which provides communications between computer processor(s) 502, memory 504, cache 506, persistent storage 510, communications unit 514, and input/output (I/O) interface(s) 512. Communications fabric 508 can be implemented with any architecture designed for passing data and/or control information between processors (such as microprocessors, communications and network processors, etc.), system memory, peripheral devices, and any other hardware components within a system. For example, communications fabric 508 can be implemented with one or more buses.

Memory 504 and persistent storage 510 are computer-readable storage media. In this embodiment, memory 504 includes random access memory (RAM). In general, memory 504 can include any suitable volatile or non-volatile computer readable storage media. Cache 506 is a fast memory that enhances the performance of processors 502 by holding recently accessed data, and data near recently accessed data, from memory 504.

Program instructions and data used to practice embodiments of the present invention may be stored in persistent storage 510 and in memory 504 for execution by one or more of the respective processors 502 via cache 506. In an embodiment, persistent storage 510 includes a magnetic hard disk drive. Alternatively, or in addition to a magnetic hard disk drive, persistent storage 510 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 510 may also be removable. For example, a removable hard drive may be used for persistent storage 510. Other examples include optical and magnetic disks, thumb drives, and smart cards that are inserted into a drive for transfer onto another computer-readable storage medium that is also part of persistent storage 510.

Communications unit 514, in these examples, provides for communications with other data processing systems or devices, including resources of network 120. In these examples, communications unit 514 includes one or more network interface cards. Communications unit 514 may provide communications through the use of either or both physical and wireless communications links. Program instructions and data used to practice embodiments of the present invention may be downloaded to persistent storage 510 through communications unit 514.

I/O interface(s) 512 allows for input and output of data with other devices that may be connected to computing device 500. For example, I/O interface 512 may provide a connection to external devices 516 such as a keyboard, keypad, a touch screen, and/or some other suitable input device. External devices 516 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 510 via I/O interface(s) 512. I/O interface(s) 512 also connect to a display 518.

Display 518 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, at a scheduler, a first job, wherein the scheduler manages one or more running jobs based on a plurality of system resources, wherein the plurality of system resources comprises at least one resource constraint, and wherein the at least one resource constraint is a backfill time window;
   estimating, by one or more processors, one or more resource requirements of the first job, wherein a first resource requirement of the one or more resource requirements is a job runtime;
   determining, by one or more processors, that the first resource requirement of the one or more resource requirements exceeds the at least one resource constraint;
   in response to determining that the first resource requirement of the first job exceeds the at least one resource constraint, modifying, by one or more processors, the first resource requirement of the first job by increasing a number of processors for the first job; and
   scheduling, by one or more processors, the first job.

2. The method of claim 1, wherein receiving the first job by the scheduler further comprises determining, by one or more processors, the first job is waiting for at least one plurality of system resources to become available.

3. The method of claim 1, further comprising:
   wherein modifying the first resource requirement of the first job further comprises:
   determining, by one or more processors, a target central processing unit frequency based, in part, on a duration of the backfill time window and the job runtime at one or more central processing unit frequencies.

4. The method of claim 1, wherein modifying the first resource requirement of the first job further comprises:
   determining, by one or more processors, a target central processing unit frequency based, in part, on a target energy consumption.

5. The method of claim 1, wherein a portion of the plurality of system resources is not used by the one or more running jobs, and wherein the backfill time window comprises the unused portion of the system resources.

6. The method of claim 5, wherein scheduling the first job comprises:
assigning, by one or more processors, a portion of the unused system resources to process the first job, wherein the first job fits in the backfill time window.

7. A computer program product, the computer program product comprising:
a computer-readable storage medium and program instructions stored on the computer-readable storage medium, the program instructions comprising:
program instructions to receive a first job at a scheduler, wherein the scheduler manages one or more running jobs based on a plurality of system resources, wherein the plurality of system resources comprises at least one resource constraint, and wherein the at least one resource constraint is a backfill time window;
program instructions to estimate one or more resource requirements of the first job, wherein a first resource requirement of the one or more resource requirements is a job runtime;
program instructions to determine that the first resource requirement of the one or more resource requirements exceeds the at least one resource constraint;
in response to determining that the first resource requirement of the first job exceeds the at least one resource constraint, program instructions to modify the first resource requirement of the first job by increasing a number of processors for the first job; and
program instructions to schedule the first job.

8. The computer program product of claim 7, wherein receiving the first job by the scheduler further comprises:
program instructions to determine the first job is waiting for at least one plurality of system resources to become available.

9. The computer program product of claim 7, wherein modifying the first resource requirement of the first job further comprises:
program instructions to determine a target central processing unit frequency based, in part, on a duration of the backfill time window and the job runtime at one or more central processing unit frequencies.

10. The computer program product of claim 7, wherein modifying the first resource requirement of the first job further comprises:
program instructions to determine a target central processing unit frequency based, in part, on a target energy consumption.

11. The computer program product of claim 7, wherein a portion of the plurality of system resources is not used by the one or more running jobs, and wherein the backfill time window comprises the unused portion of the system resources.

12. The computer program product of claim 11, wherein scheduling the first job comprises:
program instructions to assign a portion of the unused system resources to process the first job, wherein the first job fits in the backfill time window.

13. A computer system, the computer system comprising:
one or more computer processors;
one or more computer readable storage media;
program instructions stored on the computer readable storage media for execution by at least one of the one or more processors, the program instructions comprising:
program instructions to receive a first job at a scheduler, wherein the scheduler manages one or more running jobs based on a plurality of system resources, wherein the plurality of system resources comprises at least one resource constraint, and wherein the at least one resource constraint is a backfill time window;
program instructions to estimate one or more resource requirements of the first job, wherein a first resource requirement of the one or more resource requirements is a job runtime;
program instructions to determine that the first resource requirement of the one or more resource requirements exceeds the at least one resource constraint;
in response to determining that the first resource requirement of the first job exceeds the at least one resource constraint, program instructions to modify the first resource requirement of the first job by increasing a number of processors for the first job; and
program instructions to schedule the first job.

14. The computer system of claim 13, wherein receiving the first job by the scheduler comprises:
program instructions to determine the first job is waiting for at least one plurality of system resources to become available.

15. The computer system of claim 13, wherein modifying the first resource requirement of the first job further comprises:
program instructions to determine a target central processing unit frequency based, in part, on a duration of the backfill time window and the job runtime at one or more central processing unit frequencies.

16. The computer system of claim 13, wherein modifying the first resource requirement of the first job further comprises:
program instructions to determine a target central processing unit frequency based, in part, on a target energy consumption.

17. The computer system of claim 13, wherein a portion of the plurality of system resources is not used by the one or more running jobs, and wherein the backfill time window comprises the unused portion of the system resources.

18. The computer system of claim 17, wherein scheduling the first job comprises:
program instructions to assign the portion of the unused system resources to process the first job, wherein the first job fits in the backfill time window.

* * * * *